APPARATUS FOR SERVING A STRAND ON A TRAVELLING CORE

Original Filed May 12, 1954 2 Sheets-Sheet 1

APPARATUS FOR SERVING A STRAND ON A TRAVELLING CORE

Original Filed May 12, 1954 2 Sheets-Sheet 2

INVENTOR.
DEAN L. WILLIAMS

BY

John W. Hoag.
ATTORNEY

United States Patent Office

Re. 24,592
Reissued Jan. 20, 1959

24,592

APPARATUS FOR SERVING A STRAND ON A TRAVELLING CORE

Dean L. Williams, Rome, N. Y., assignor to Rome Cable Corporation, Rome, N. Y., a corporation of New York Original No. 2,807,129, dated September 24, 1957, Serial No. 429,299, May 12, 1954. Application for reissue February 24, 1958, Serial No. 717,284

19 Claims. (Cl. 57—18)

Matter enclosed in heavy brackets [ ] appears in the original patent but forms no part of this reissue specification; matter printed in italics indicates the additions made by reissue.

This invention relates to apparatus for serving a strand onto and around a travelling core. The word "strand" is used broadly and includes tapes, yarn, thread and the like, of paper, glass fiber, cotton or other covering or insulating material. The word "core" is used broadly and includes thread, yarn, cord, rope including metal rope, wire, cable and the like.

The invention is described herein in connection with winding a covering of insulating tape around a travelling wire or cable. Devices for this purpose customarily have comprised a unitary hollow shaft having disposed concentrically around its front end a flyer, which is essentially a cup-like member opening forwardly and carrying one or more strand guide pins. The core to be covered is pulled through the hollow shaft as the flyer is rotated at high speed. The strand is supplied in a package called a "cop" which is furnished wound on a tube usually made of cardboard. The tube with the cop wound thereon is placed on a sleeve which is rotatable on the hollow shaft within said cup-like member or flyer. As the flyer rotates the strand is unwound from the cop and guided first outwardly to the periphery of the flyer and then inwardly to and around the core. The speed of winding of the strand relative to the axial speed of travel of the core determines whether the core is lap wound, butt wound or space wound. The sleeve is mounted so that it can rotate with respect to the hollow shaft and said cup-like member as the strand is unwound from the cop, and the rotation of the sleeve is retarded by brake means to cause the strand to be wound on the core under slight tension.

It is desirable to run a flyer as fast as possible consistent with a high quality product, which is one comprising a strand served evenly around a core, under uniform tension. Flyers heretofore available are deficient in many respects. When used at high speed they are subject to vibration and erratic action of the brake means, which affects the rotation of the cop. These defects in turn cause breakage of the strand and skips in the core covering.

The brake means of the prior art could not be adjusted without stopping the whole serving apparatus including means for advancing the wire or cable.

The sleeve on which the cop carrying tube is mounted must be rotatable with respect to the hollow shaft and surrounding cup-like flyer but the tubular members on which the standard packages or cops of serving material are supplied are of small diameter, ordinarily having an inside diameter of 1⅝" or 2⅛" and there is not room between the hollow shaft and the sleeve for even the smallest prelubricated and sealed ball bearing assemblies which are commercially available, comprising inner and outer races separated by ball bearings. It has heretofore been customary to rotatably support the sleeve within this space using cone type ball bearings. It has been believed that this arrangement was necessary although it has been recognized that it has several disadvantages which have caused such bearing means to become obsolete for most applications. In prior art devices of this kind it has been difficult to seal in lubricant and keep dirt out. It has also been difficult to reduce the radial play of the sleeve to a negligible amount. Furthermore use of the cone and ball arrangement entails having portions of the surfaces of said hollow shaft and of said sleeve especially hardened to serve as bearing surfaces, in order to avoid undue wear. This involves special custom work which is very expensive compared to the cost of the sealed ball bearing assemblies which are commercially available. These are relatively inexpensive since they are manufactured in large volume.

Furthermore, in apparatus now used for serving a strand around and onto a wire or cable core the cops are held on the rotating sleeve by friction, between the tube on which the cop is wound, and the sleeve, and the frictional grip is not adjustable. This requires very great accuracy in manufacturing the tubular members, the tolerance permitted being only on the order of .005 of an inch. This requirement renders the cost of the tubular members very high.

It is an object of the invention to provide serving apparatus which has a minimum of loose parts and is characterized by absence of vibration.

Another object of the invention is to provide serving apparatus in which a sleeve adapted to receive cops of serving material wound on tubes of standard diameter may be supported for rotation on prelubricated sealed ball bearing assembly units of a size now commercially available, and disposed in such a way that the cop mounting sleeve is substantially free of radial or axial play, thus eliminating one of the principal causes of vibration in prior art devices.

Another object of the invention is to provide serving apparatus with brake means which is simple in action and which can be adjusted while the flyer is in motion.

Another object of this invention is to provide the cop-mounting sleeve with means for varying its diameter thus providing dependable frictional engagement between the sleeve and tubular members on which the cop is wound while permitting substantial tolerance in the diameter of said tubes.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which—

Figure 1:
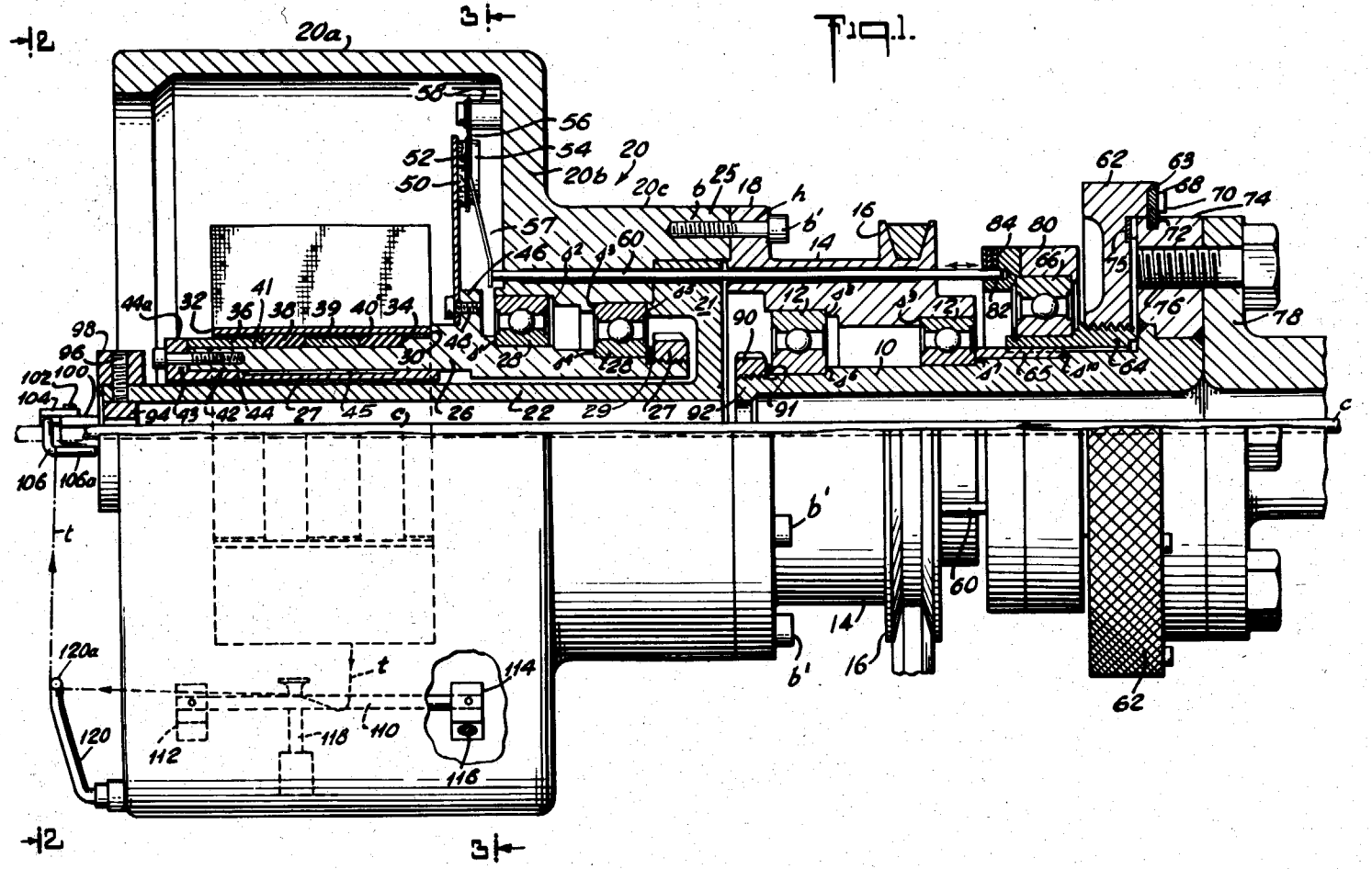
Figure 1 is a side elevation partly in section of an embodiment of the invention.
Figure 2:
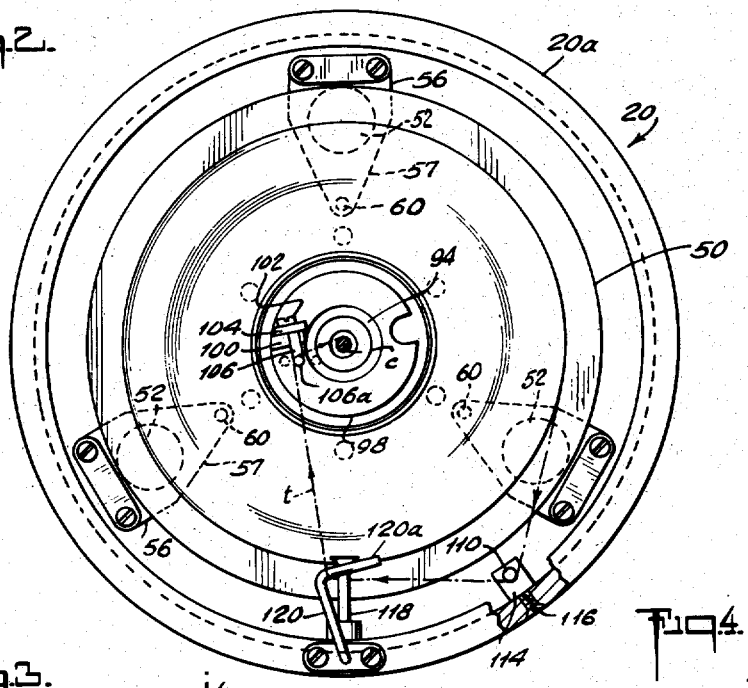
Figure 2 is a front elevation of the apparatus shown in Figure 1.
Figure 3:
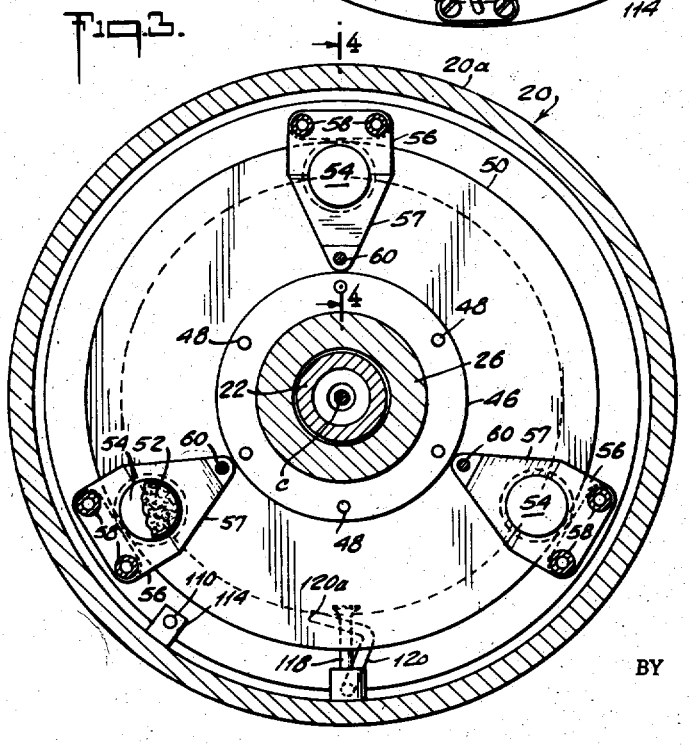
Figure 3 is a vertical section taken on the line 3—3 of Figure 1.
Figure 4:
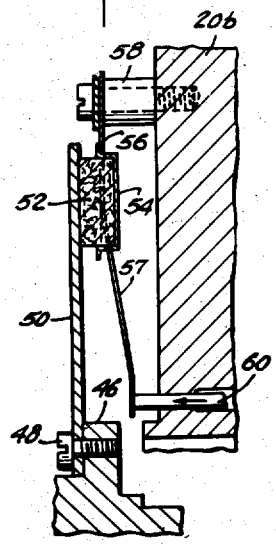
Figure 4 is a fragmental sectional view taken on the the line 4—4 of Figure 3.

Prior art apparatus for applying a strand to a traveling core has usually consisted of a long unitary hollow shaft mounted in two pillow blocks, or a similar bearing arrangement, and the entire shaft has been rotated. In contrast the improved apparatus disclosed herein comprises a two-part hollow shaft, the first or rear part 10 being stationary and supported from its rear end, and the second or front part 22 being integral, or otherwise combined, with a flyer 20 and rotatable with the flyer, and the combined shaft 22 and flyer 20 being supported from the rear end and rotated by driving means rotatable around said rear shaft 10.

The driving means shown is the sleeve 14 mounted for rotation around said stationary shaft member 10, on ball bearing assembly units 12, which are preferably of the prelubricated sealed type which are now commercially available. Sleeve 14 has adjacent its rear end a drive pulley 16, adapted to be driven by a V-belt drive, and having adjacent its front end the circular mounting flange 18 which is provided with a number of holes h, spaced at equal intervals and extending through the flange axially of shaft member 10.

Positioned in front of stationary hollow shaft 10 and aligned with it is the hollow shaft 22. Shaft 22 is interconnected with the flyer 20, which is cup-shaped and has a front portion 20a and a rear portion 20c of less diameter than the front portion, interconnected by a radially extending portion 20b, by the circular radial web 21 extending between the rear end of shaft 22 and the rear portion 20c of the flyer. The rear portion 20c of the flyer comprises a rearwardly extending circular flange 25 which abuts against the circular mounting flange 18 of drive member 14 and has the internally threaded bores b in is rear end face to receive screws $b^1$ inserted through the holes h in said mounting flange 18 to interconnect flanges 18 and 25 for supporting the combination of shaft 22 and flyer 20 and to rotate them when drive member 14 is rotated.

Surrounding front shaft 22, between it and the portion 20a of flyer 20, is the cop mounting sleeve 26. It will be noted that sleeve 26 is spaced radially from shaft 22, and that it is supported adjacent its rear end on ball bearing assemblies 28, which are preferably of the prelubricated and sealed unit type now commercially available, positioned between the rear end of said [shaft 22] *sleeve 26* and the surrounding rear portion 20c of flyer 20, which is of less diameter than its forward portion 20a.

The cop receiving portion of said sleeve 26 extends from its front end to the shoulder 30. The diameter of this portion of sleeve 26 is substantially the same as the inside diameter of tubes 32 on which the cops of tape are wound and which, as stated above, are at the present time furnished in sizes of 1⅝" and 2⅛" inside diameter. As shown in Figure 1 this front portion of sleeve 26 is reduced in diameter to the shoulder 34 and filling the space thus provided around sleeve 26 are the rings 36, 38, 39 and 40, axially movable on said shaft. Rings 38 and 40 respectively are expansion rings which may be of known kind and are characterized in that, as they are compressed axially they expand radially and are thus able to provide a friction grip for cop carrying tubular members 32 which would otherwise fit loosely around said sleeve 26.

Extending into sleeve 26 from its front end is a bore 41 in which an Allan cap screw 42 is insertable through a bore 43 in the radially extending flange portion 44a of the cop locking sleeve 44 which extends from the front into the space between shaft member 22 and sleeve 26, and is keyed to sleeve 26 by key 45 for rotation therewith around shaft 32. It will be seen that by tightening the screw 42 the flange 44a of said cop locking sleeve 44 is caused to exert pressure acting axially on said rings 36, 38, 39 and 40, thus causing the said expansion rings 38 and 40 to expand radially. Upon loosening screw 42 the pressure acting axially on said rings is relieved and the radial expansion of rings 38 and 40 is correspondingly decreased. This means of adjusting the effective diameter of sleeve 26 is of considerable practical importance because it greatly increases the diameter tolerance permitted in the manufacture of the tubes 32, on which cops of strand material are wound, thus materially decreasing the cost of such tubes.

The rear portion of sleeve 26, to the rear of shoulder 30 and radial flange *46* [48], comprises portions of different diameter. The resulting stepped formation provides a shoulder $s^1$ in abutting relation to the front of front bearing assembly 28 and a shoulder $s^4$ in abutting relation to the front of rear bearing assembly 28.

The portion 20c of the flyer comprises stepped portions of different diameter providing a shoulder $s^2$ in abutting relation to the rear of front bearing assembly 28, a shoulder $s^3$ in abutting relation to the front of rear bearing assembly 28, and a shoulder $s^5$ in abutting relation to the rear of rear bearing assembly 28. In addition the rear bearing 28 is held from moving rearwardly on shaft 22 by the nut 27 screwed around its rear extremity and spaced from the bearing by the washer 29.

The annular space available between the rear ends of flyer portion 20c and the rear portion of sleeve 26 is much greater than the space between shaft 22 and the forward portion of sleeve 26, which receives the tubes 32 on which the cops are wound, and the diameter of which is limited by the size of the diameter of tubes now commerically available. As a result ball bearing assemblies of the sealed self lubricated type which are mass produced and commercially available may be employed thus overcoming one of the deficiencies of prior art apparatus of the kind described. Furthermore the stepped opposing surfaces of the flyer and sleeve provide shoulders which prevent relative movement between the bearings 28 and said flyer and sleeve 26, and since the flyer and [sleeve 26] *shaft 22* are interconnected or integral this structure also serves to prevent vibratory movement of sleeve 26 axially of shaft 22.

Similarly shaft 10 is stepped to provide a shoulder $s^6$ abutting the rear face of front bearing assembly 12 and the shoulder $s^7$ abutting against the rear face of the rear bearing 12, and driving member 14 is stepped thereby providing a shoulder $s^8$ abutting the rear face of front bearing assembly 12 and the shoulder $s^9$ abutting the front face of rear bearing assembly 12. In addition, front bearing assembly 12 is held against movement forwardly on shaft 10 by the nut 90 screwed around the forward end of shaft 10 and the washer 91 interposed between said nut and said front bearing 12.

Projecting radially from sleeve 26 to the rear of said shoulder 30 is a circular flange *46* [48] and demountably mounted on said flange as by screws *48* [49] is a disk 50 which may for example be made of any suitable material, such for example as metal or plastic, against which bear the friction pads 52, which may for example be of cork, and are contained within cup-shaped holders 54 mounted on spring steel arms 56 which are respectively supported on spacing members 58 projecting forwardly from the radially extending portion 20b of flyer 20. The said supporting spring steel members 56 have the extentions 57 extending below the friction pads 52 into abutting relation with the inner ends of control rods 60 respectively, which are disposed in parallel relation to shafts 10 and 22 and are movable axially of said shafts to increase or decrease the pressure with which said friction pads 52 contact the said friction disk 50 by moving the free ends of said spring extensions 57 of said spring arms 56 toward or away from said friction disk.

Movement of said control rods 60 toward or away from said spring members 57 is controlled by rotation of the knurled annular ring 62 the inner surface of which is threadedly engaged with the annular adjusting screw 64 which extends around stationary shaft 10 and supports bearing assembly 66. Adjusting screw 64 moves axially on stationary shaft 10, and is prevented from turning by key 65, placed in a slot in shaft 10. Key 65 is disposed axially between shoulder $s^{10}$ on shaft 10, and the rear face of the rear bearing assembly 12.

Ring 62 is held from moving axially of shaft 10 by the split ring 68 which is secured to the laterally extending flange portion 63 of ring 62 by screw 70 and extends into, and travels in, a groove 72 in the periphery of a stationary ring 74 surrounding the rear extremity of shaft 10 and secured by screws 76 to support member 78. Between knurled adjusting ring 62 and stationary ring 74 is the friction spring member 75 which serves to maintain friction between members 62 and 74 to prevent inadvertent relative movement between them.

Around bearing assembly 66 the ring 80 is provided, having in its front face the bores 82 in which the rear ends of said control rods 60 are received. The rear ends of said rods are held in position within said bores 82 by the locking screws 84 respectively which extend from the periphery of ring 80 into said bores. As the knurled ring 62 is turned the adjusting screw 64, bearing assembly 66, and the ring member 80, are moved back and forth axially of said shaft 10 as desired causing the front ends of said control rods 60, which are in continuous contact with said brake pad spring retaining members 57 to position said members to increase or decrease the braking force of the friction pads 52 on said friction disk 50 thereby adjusting the drag between sleeve 26 and flyer 20 to control the tension on the strand being unwound from the cop and served on the core which is travelling successively through said hollow shafts 10 and 22.

In its travel through said shafts 10 and 22 the travelling core is guided and maintained out of contact with the rotating shaft member 22 by an inwardly extending flange 92 at the front end of stationary shaft 10 and by the ring 94 positioned within shaft 22 at its front end and held in place by screw 96 extending through the shaft and the nose piece 98, provided at the front end of said rotating hollow shaft 22. Projecting forwardly from nose piece 98 and integral with it is the ear 100. Pivotally mounted on ear 100 by pivot screw 102 is the bracket 104 from which extends guide pin 106. The guide pin 106 is an angularly bent member the lower free portion 106a of which is susbtantially parallel to the core travelling through said sleeves 10 and 22 but may be swung around its pivot toward or away from said core to control the angle at which a strand passing over it is served to and around the travelling core.

As the strand t is unwrapped from the cop it first passes around a guide pin 110 supported on the inner surface of the flyer between the two spaced brackets 112 and 114 held to the inner surface of the flyer by the screws 116 extending through the wall of the flyer. After passing around pin 110 the strand is advanced to and around the guide post 118, projecting radially inward from the inner surface of the flyer, to and around the bent over extremity 120a of the inwardly extending guide 120. From the guide member 120 the strand passes to and around the bent over outer portion 106a of guide pin 106, the angular position of which determines the angle at which the strand is served upon the travelling core c.

It will be noted that the guide pin 110 extends substantially at right angles to the guide post 118, which in turn is substantially at right angles to the bent over end portion 120a of guide 120, and the bent over end portion 120a is substantially at right angles to the bent over end portion 106a of guide pin 106. Thus the strand, in travelling from the cop to the core, passes over four guide members and in each instance its path of travel to and from each guide member is substantially at right angles to the guide member, and its path of travel to a guide member is substantially at right angles to its path of travel from the guide member to the next guide member. This disposition of the guide means results in a relatively uniform tension throughout the cross section of the strand as it is paid off from the cop and served onto the travelling core.

The device described herein has the advantages that it makes possible high speed of strand application without vibration which causes breakage and excess wear; longer wear due to improved bearing means, and more uniform application of the strand to the travelling core with less skips due to the freedom of the device from vibration. It has the further advantages that it requires less space than the prior art flyers; cops may be installed and removed with greater ease; and the cop carrying tubes can be supplied at less cost since their diameter measurement becomes less critical. The suspension of the device from the rear end together with the provision of a two-part shaft including a rotatable front shaft *and a flyer and sleeve* the rear portions of which [is] *are* stepped makes possible the use of prelubricated sealed bearing units eliminating the problem of cleaning and lubricating as well as giving the flyer longer life; and, due to the construction of the hollow shaft in two parts interconnected through the mounting flange 18 removal of the rear bearings, if required, can be accomplished in a simple manner by detaching the front shaft and flyer from the drive sleeve which is rotatable around rear shaft 10.

It should be understood that the present disclosure is for the purpose of illustration only and that this invention includes all modifications and equivalents which fall within the scope of the appended claims.

What I claim is:

1. Apparatus for serving a strand onto and around a travelling core which comprises, a first fixed hollow shaft, a second hollow shaft separate from said first shaft and disposed in front of said first shaft and in axial alignment with said first shaft, a flyer fixed to said second shaft and having a cup-shaped portion extending around, and in spaced relation to, said second shaft, rotatable means supported on said first shaft, means interconnecting said second shaft and flyer with said rotatable means for rotation with said rotatable means, a sleeve surrounding said second shaft, and means disposed between said sleeve and said flyer for spacing said sleeve from said second shaft and mounting said sleeve for rotation around said second shaft.

2. The apparatus claimed in claim 1 in which said rotatable means comprises a radial flange, and the connection means of said second shaft and flyer comprises a flange portion extending rearwardly toward said radial flange, and means are provided for interconnecting said radial flange and said flange portion.

3. The apparatus claimed in claim 1 in which said sleeve comprises a front cop receiving portion and a rear portion, the rear portions of said flyer and said sleeve, respectively comprising portions of different diameter, the said portions of the sleeve and flyer being opposed with a portion of one opposed by a portion of the other which is oppositely modified in diameter, and sealed self lubricating ball bearing assembly means is provided between the said rear portions of said flyer and sleeve.

4. The apparatus claimed in claim 3 in which a rear portion of said second hollow shaft is spaced radially from a rear portion of the flyer by a distance greater than the radial distance between a forward portion of said second shaft and the inner surface of a portion of said sleeve surrounding the said forward portion of said second shaft.

5. The apparatus claimed in claim 1 in which rear portions of said cup-shaped flyer and said sleeve respectively have a plurality of pairs of opposed portions of different diameter forming shoulders, and sealed self lubricating ball bearing assembly means is provided between the said opposed portions of said flyer and sleeve, said shoulders coacting with said ball bearing assembly means respestively to prevent relative movement between said sleeve and said second shaft axially of said shaft.

6. The apparatus claimed in claim 1 in which said sleeve is mounted on ball bearing assembly means interposed between it and the inner surface of said flyer, and shoulder means is provided on said sleeve positioned to coact with said ball bearing assembly means to prevent relative movement axially of *said* second shaft, between said sleeve and the combination comprising said second shaft and flyer [axially of said second shaft].

7. The apparatus claimed in claim 1 in which the rotatable mounting means for said sleeve comprises ball bearing assembly means and in which said second shaft has a radially extending flange positioned to coact with said ball bearing assembly means to prevent axial relative movement between said sleeve and the combination comprising said second shaft and flyer.

8. The apparatus claimed in claim 1 in which said cup-shaped flyer is connected to said second shaft by a radially extending web projecting from said second shaft adjacent its rear end, and said sleeve is disposed concentrically around said second hollow shaft but spaced radially from said shaft and is supported on bearing means positioned between said flyer and the rear end portion of said sleeve.

9. The apparatus claimed in claim 1 in which said cup-shaped flyer is connected to said second shaft by a radially extending web projecting from said second shaft adjacent its rear end, and said sleeve is disposed concentrically around said second hollow shaft but spaced radially from said shaft and is supported on bearing means positioned between said flyer and the rear end portion of said sleeve, the rear end portion of said sleeve comprising portions of different diameter providing radial shoulder means which coact with said bearing means for preventing movement of said sleeve axially of said second shaft.

10. The apparatus claimed in claim 1 in which said cup-shaped flyer is connected to said second shaft by a radially extending web projecting from said second shaft adjacent its rear end, and said sleeve is disposed concentrically around said second hollow shaft but spaced radially from said shaft and is supported on bearing means positioned between said flyer and the rear end portion of said sleeve, the rear end portion of said flyer comprising portions of different diameter providing radial shoulder means which coact with said bearing means for preventing movement of said sleeve axially of said second shaft.

11. The apparatus claimed in claim 1 in which said flyer comprises a forward portion and a rear portion, the rear portion being of less diameter than the forward portion and itself comprising portions of different inside diameter, the rear end portion of said sleeve surrounded by said rear portion of said flyer comprising portions of different diameter radially aligned respectively with the said portions of the rear portion of said flyer to provide a plurality of annular seats between said flyer and sleeve, disposed at different distances radially from said second shaft, to respectively receive ball bearing assemblies and provide shoulder means in abutting relation to said ball bearing assemblies respectively to prevent movement of said sleeve axially of said second shaft.

12. Apparatus for winding a strand on a moving core comprising a first hollow shaft, a composite flyer and a second hollow shaft, said second hollow shaft being axially aligned with, but separate from said first shaft, rotatable means mounted for rotation around said first shaft, means interconnecting said rotatable means with said composite flyer and second shaft, a sleeve mounted for rotation around said second shaft and having a forward portion for receiving a cop of strand material to be served onto a core travelling through said shafts successively, and a rear portion, and bearing means disposed between said flyer and the said rear portion of said sleeve for supporting said sleeve.

13. Apparatus for winding a strand on a moving core comprising a first hollow shaft, a composite flyer and second hollow shaft, said second hollow shaft being axially aligned with, but separate from said first shaft, rotatable means mounted for rotation around said first shaft, means interconnecting said rotatable means with said composite flyer and second shaft, a sleeve mounted for rotation around said second shaft and having a portion for receiving a cop of strand material to be served onto a core travelling through said shaft successively, brake means for said sleeve and means for manually adjusting said brake means without stopping the winding operation to control the braking force applied to said sleeve.

14. Apparatus for winding a strand on a moving core comprising a first hollow shaft, a composite flyer and second hollow shaft, said second hollow shaft being axially aligned with, but separate from said first shaft, rotatable means mounted for rotation around said first shaft, means interconnecting said rotatable means with said composite flyer and second shaft, a sleeve mounted for rotation around said second shaft and having a portion for receiving a cop of strand material to be served onto a core travelling through said shafts successively, and brake means for said sleeve comprising friction pads supported from the flyer by spring members and movable toward or away from friction means supported on said sleeve, in which means are provided, operable at all times including when said flyer is rotating to control the portion of said spring member to thereby adjust the braking force between said pads and said friction means supported on the sleeve.

15. The apparatus claimed in claim 14 in which bores are provided extending through said composite flyer and second shaft and through the means for rotating said composite flyer and second shaft, and brake control rod means is inserted in said bores respectively into contact with the spring member supporting said pads respectively, and means are provided remote from said brake means for moving said control rod means to adjust the position of the said spring member toward or away from the friction means carried by said sleeve.

16. The apparatus claimed in claim 1 in which a number of guide means are mounted on said composite flyer and second shaft for guiding a strand in its travel between said cop and said moving core around which it is served, the guiding surface of each of said guide means being disposed at right angles to the guide surface of the preceding and following guide means and controlling the strand so that upon leaving each guide surface it travels substantially at right angles to its line of travel to the guide surface.

17. The apparatus claimed in claim 12 including a nose piece comprising a ring fixed to the outer end of said second shaft and having an ear projecting forwardly axially of the shaft and a strand guide swingably supported from said ear to adjust the angular position of said guide surface relative to the core to control the angle at which a strand passing over said guide surface is served onto the travelling core.

18. The apparatus claimed in claim 1 in which said spacing and mounting means comprise ball bearings disposed between the rear end of said sleeve and the flyer.

19. The apparatus claimed in claim 14 in which the means for adjusting the said braking force comprises control rod means, slidably mounted for rotation with said flyer and said second shaft and movable by remote control means to adjust the frictional contact between said pads and said friction means.

References Cited in the file of this patent or the original patent

UNITED STATES PATENTS

| | | |
|---|---|---|
| 353,938 | Harrison | Dec. 7, 1886 |
| 1,890,929 | Borgeson | Dec. 13, 1932 |
| 1,934,363 | Littlefield | Nov. 7, 1933 |
| 2,066,659 | Templeton et al. | Jan. 5, 1937 |
| 2,666,289 | Bunch | Jan. 19, 1954 |

FOREIGN PATENTS

| | | |
|---|---|---|
| 128,708 | Switzerland | Dec. 1, 1928 |